United States Patent
Biddulph et al.

(10) Patent No.: US 12,498,281 B2
(45) Date of Patent: Dec. 16, 2025

(54) DEVICE AND METHOD FOR MONITORING COMPRESSION LEVEL OF A COMPRESSION GARMENT

(71) Applicant: Julius Zorn, Inc., Cuyahoga Falls, OH (US)

(72) Inventors: Greg Biddulph, Cuyahoga Falls, OH (US); Adrian Slattery, Cuyahoga Falls, OH (US)

(73) Assignee: Julius Zorn, Inc., Cuyahoga Falls, OH (US)

( * ) Notice: Subject to any disclaimer, the term of this patent is extended or adjusted under 35 U.S.C. 154(b) by 284 days.

(21) Appl. No.: 18/546,350

(22) PCT Filed: Mar. 21, 2022

(86) PCT No.: PCT/US2022/021090
§ 371 (c)(1),
(2) Date: Aug. 14, 2023

(87) PCT Pub. No.: WO2022/203991
PCT Pub. Date: Sep. 29, 2022

(65) Prior Publication Data
US 2024/0118154 A1 Apr. 11, 2024

Related U.S. Application Data

(60) Provisional application No. 63/211,241, filed on Jun. 16, 2021, provisional application No. 63/166,285, filed on Mar. 26, 2021.

(51) Int. Cl.
*G01L 5/106* (2020.01)
*G01L 1/22* (2006.01)

(52) U.S. Cl.
CPC ............ *G01L 5/106* (2013.01); *G01L 1/2206* (2013.01)

(58) Field of Classification Search
CPC .............................. G01L 5/106; G01L 1/2206
See application file for complete search history.

(56) References Cited

U.S. PATENT DOCUMENTS

| 2009/0095094 A1* | 4/2009 | Helmer | G01D 5/165 |
| | | | 73/865.4 |
| 2012/0071917 A1* | 3/2012 | McDonald | G01L 5/102 |
| | | | 116/212 |
| 2019/0094004 A1* | 3/2019 | Okumiya | G01L 1/2206 |

FOREIGN PATENT DOCUMENTS

| WO | 8703087 | 5/1987 | |
| WO | WO-8703087 A1 * | 5/1987 | ............. G01L 5/102 |

OTHER PUBLICATIONS

International Search Report mailed Jul. 4, 2022, for priority International Application No. PCT/US2022/021090.

* cited by examiner

*Primary Examiner* — Jamel E Williams
(74) *Attorney, Agent, or Firm* — Renner, Otto, Boisselle & Sklar, LLP

(57) ABSTRACT

A compression measuring device includes a substrate configured to be attached to a first location on a stretchable fabric of a worn compression garment. The compression measuring device includes a deformable arm cantilevered across a first end of the substrate, being fixed to the substrate at a fixed end and extending across the first end of the substrate to a cantilevered end of the deformable arm. The compression measuring device includes a bridge attached to the deformable arm at a first end of the bridge and extending away from the deformable arm out past a second end of the substrate. A second end of the bridge is attached to a second location on the stretchable fabric. The compression measuring device includes a strain gauge mounted to the deformable arm and configured to measure an electrical resistance (Continued)

when the bridge pulls on and deforms the deformable arm. The electrical resistance measurement is used to determine a percentage stretch of the stretchable fabric, which is combined with a limb measurement of a user to determine a compression level when the compression garment is worn by the user.

18 Claims, 7 Drawing Sheets

DEVICE AND METHOD FOR MONITORING COMPRESSION LEVEL OF A COMPRESSION GARMENT

This application is a national phase of International Application No. PCT/US2022/021090 filed Mar. 21, 2022, which claims priority to U.S. Patent Application No. 63/211,241 filed Jun. 16, 2021, and to U.S. Patent Application No. 63/166,285 filed Mar. 26, 2021, each of which is hereby incorporated herein by reference in its entirety.

FIELD OF INVENTION

The present application relates generally to compression garments, and more particularly to devices and methods for detecting compression levels of a worn compression garment and determining patient compliance in wearing a compression garment at a particular compression level.

BACKGROUND OF THE INVENTION

Therapeutic compression garments are worn to prevent the build-up of fluid in the limbs, a condition commonly referred to as edema, and to help alleviate various types of vascular insufficiencies. Persons who may use such a garment include post-surgical patients, obese persons, and persons with ailments that impede circulation, such as Chronic Venous Insufficiency, Lymphedema, and diabetics. Compression garments improve circulation and prevent fluid from collecting in the extremities, such as in the legs, feet and ankles (lower extremity garments) or arms and hands (upper extremity garments). By improving circulation and reducing the propensity toward fluid build-up, compression garments relieve swelling and associated pain, prevent and help in the treatment of ulcers, and prevent other issues that can result from poor circulation in the limbs.

To optimize the effectiveness of such garments, the garments must be worn by patients in compliance with appropriate compression levels corresponding to an amount of pressure applied to the limb by the compression garment. Accordingly, it is desirable to provide some means of measuring and monitoring the compression level of a compression garment when the compression garment is stretched, wrapped, and secured around a limb of the user to ensure proper usage. Previous methods of monitoring compression levels have included the use of pressure sensors, such as piezo-electric sensors, to directly measure the amount of pressure being applied to the limb by the compression garment when worn. The use of direct pressure measurement with pressure sensors has proven complex and costly to implement.

Manual methods also have been employed to measure and monitor compression level. As the compression level of a compression garment is at least partially a result of the amount of tension or stretch of the compression garment as it is wrapped around the limb of the user, other monitoring methods have included manually measuring stretch on the compression garment. For example, visible markings have been used on compression garments in combination with measurement cards to indicate the amount of stretch being applied to the compression garment based on the amount of space between the visible markings as the compression garment is stretched. This amount of stretch is then used to determine the associated tension and compression level. More manual methods are subject to human error and are inconvenient for the user.

SUMMARY OF INVENTION

There is a need in the art for an improved system and method for detecting compression levels of a worn compression garment and determining patient compliance in wearing a compression garment at a particular compression level. An aspect of the invention, therefore, is a compression measuring device attachable to a stretchable fabric of a compression garment for measuring a compression level of the compression garment. The compression measuring device includes a substrate configured to be attached to a first location on the stretchable fabric using a first anchor of the compression measuring device. The compression measuring device includes a deformable arm cantilevered across a first end of the substrate. The deformable arm is fixed to the substrate at a fixed end and extends across the first end of the substrate to a cantilevered end of the deformable arm. The compression measuring device also includes a bridge secured to the deformable arm at a first end of the bridge and extending away from the deformable arm out past a second end of the substrate. A second end of the bridge is attached to a second location on the stretchable fabric using a second anchor of the compression measuring device. The second anchor is spaced apart from the first anchor. The compression measuring device also includes a strain gauge mounted to the deformable arm and configured to measure an electrical resistance when the bridge pulls on and deforms the deformable arm as the stretchable fabric of the compression garment stretches and the first anchor and the second anchor of the compression measuring device move away from each other. The electrical resistance measurement is used to determine a percentage stretch of the stretchable fabric, which is combined with a limb measurement of a user to determine a compression level when a compression garment including the stretchable fabric is worn by the user.

Another aspect of the invention is a compression measuring assembly for measuring a compression level of a compression garment that includes the compression measuring device. The compression measuring assembly additionally includes control circuitry for transmitting the electrical resistance measured by the strain gauge, or for calculating and transmitting a compression level based on the measured electrical resistance, to an external electronic device, and a battery for providing power to the control circuitry and the strain gauge. The compression measuring assembly additionally includes a cover configured to house the control circuitry, the battery, the deformable arm, and the substrate of the compression measuring device.

Another aspect of the invention is a method of monitoring a compression level of a compression garment wrapped around a limb of a user. The method includes electronically measuring an electrical resistance of a strain gauge mounted to a deformable member when the deformable member is deformed commensurately with a stretchable fabric of the compression garment when the compression garment is wrapped around the limb of the user. The method also includes determining a percentage of stretch of the stretchable fabric based on the measured electrical resistance of the strain gauge and determining a tension of the stretchable fabric based on the determined percentage of stretch of the stretchable fabric. The method also includes calculating a compression level applied by the compression garment to the limb of the user based on the determined tension that is applied to the stretchable fabric and a measured limb dimension of the limb of the user.

DETAILED DESCRIPTION

Figure 1:
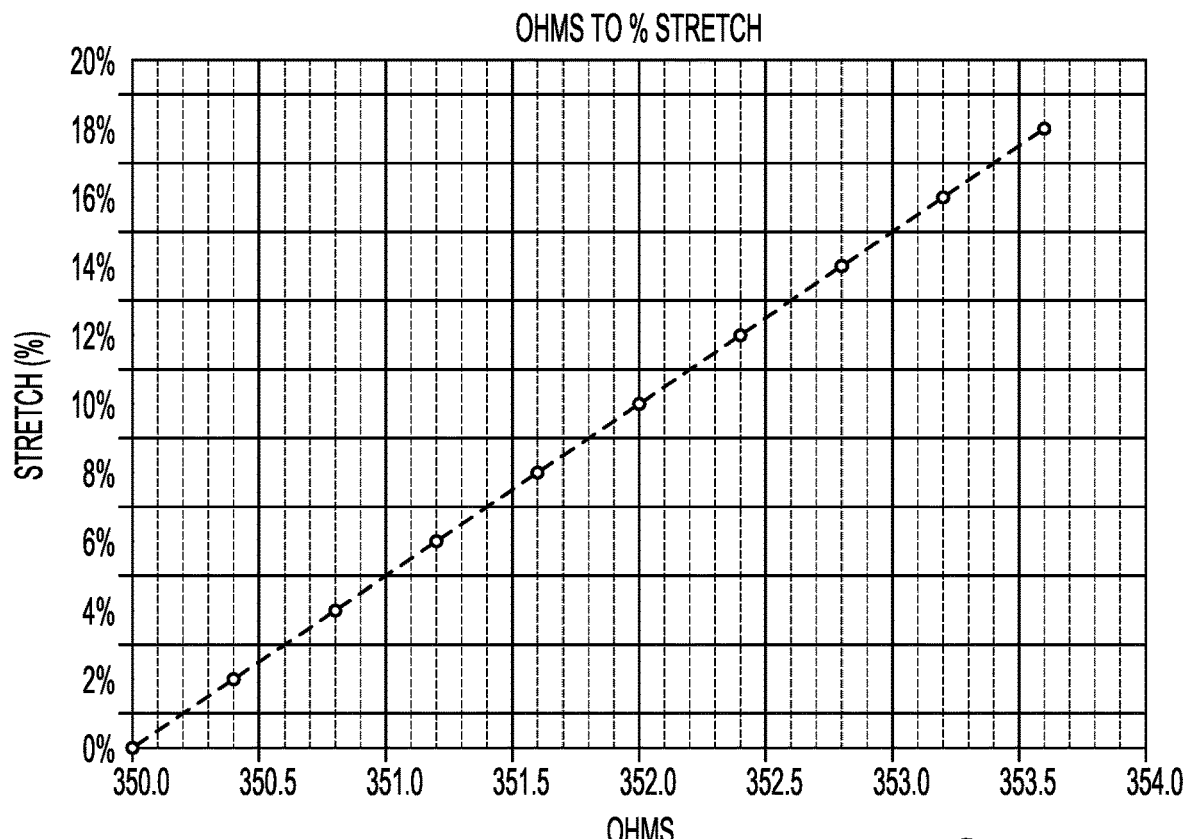
FIG. 1 is a graphical representation of the direct relationship between electrical resistance and percentage of stretch of a stretchable member.

Embodiments of the present application will now be described with reference to the drawings, wherein like reference numerals are used to refer to like elements throughout. It will be understood that the figures are not necessarily to scale.

A compression level of a compression garment worn on a user's limb may be determined using LaPlace's Law. According to LaPlace's Law, pressure equals tension divided by radius (P=T/r). This relationship can be applied to determine the compression level (i.e., pressure) of a worn compression garment when a radius of the user's limb, as well as the amount of force (i.e., tension) that is being applied by the worn compression garment when stretched, is known or otherwise can be derived. For example, the radius of a user's limb may be derived from the circumference of the limb, which may be measured using any suitable mechanism, either manually or automatically using an imaging technique. The present application employs ways in which the amount of force (i.e., tension) that is being applied by the worn compression garment when stretched may be determined, specifically using an electrical resistance measurement.

Figure 2:
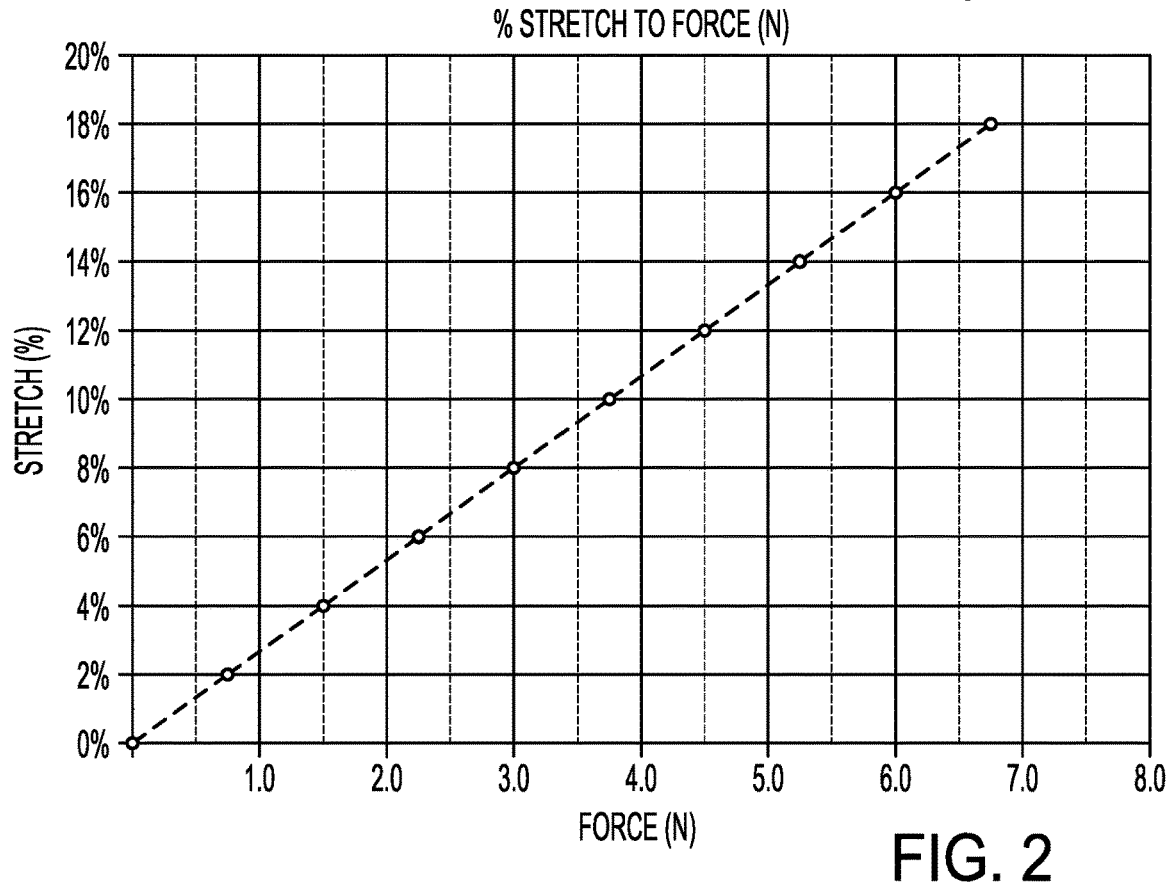
FIG. 2 is a graphical representation of the direct relationship of a percentage of stretch of a stretchable member and a force or tension of the stretchable member.

In general, when an electrically conductive material is stretchable, electrical resistance may be measured and used to determine a percentage of stretch of the material when stretched. With reference to FIG. 1, electrical resistance (Ohms) of an example stretched or deformed article is directly related to its percentage of stretch or deformation (%). The electrical resistance (Ohms) of a stretched material, therefore, can be used to determine a percentage of stretch (%) of the material. With reference to FIG. 2, the percentage of stretch (%) of the example stretchable material is also directly related to an amount of force (N; i.e., Newtons) or tension of the stretchable material.

The relationships illustrated in FIGS. 1 and 2 suggest that electrical resistance measurements may be used to determine a percentage of stretch, and thereby the amount of tension, of a compression garment that is made of a stretchable material. Accordingly, the determined percentage of stretch (%) of the worn compression garment can be used to determine the amount of force (N) or tension being applied by the worn compression garment. Based on LaPlace's Law, therefore, a compression level of the worn compression garment may be calculated by dividing the determined amount of force (N) or tension of the compression garment by the measured radius of the user's limb. In this way, compression level of the compression garment may be measured and monitored. The user can thereby ensure that a desired amount of force or tension is being applied by the stretchable fabric of the compression garment, and therefore that a desired pressure or compression level is being applied to the limb of the user by the worn compression garment.

The above suggests the measurement of electrical resistance across a stretchable fabric may be used to determine tension. To apply such principles to a worn compression garment, a conductive fabric may be incorporated into the stretchable fabric, but such incorporation may be difficult in practice. Accordingly, another option is to measure electrical resistance using a sensor device and associating such electrical resistance measurements to a percentage stretch of a compression garment stretchable fabric. For example, electrical resistance can be measured with a strain gauge applied to the stretchable fabric of the compression garment. In this manner, the electrical resistance measurement of the strain gauge may be used to determine the percentage of stretch of the stretchable fabric of the compression garment, and therefore the amount of force or tension that is applied by the stretchable fabric. Strain gauges, however, typically have an elastic limit of about 2% which is insufficient to accommodate full stretch of the compression garment fabric, and thus the stretch of the compression garment may exceed the elastic limit of the strain gauge.

In accordance with embodiments of the present application, a strain gauge is employed to obtain electrical resistance measurements which then are associated with a percentage stretch of the stretchable fabric of a compression garment. To prevent the strain gauge from exceeding its elastic limit when the stretchable fabric of the compression garment is stretched past 2% linear stretch, the strain gauge is incorporated as part of a compression measuring device configured to be attached to the stretchable fabric. The compression measuring device includes a deformable member to which the strain gauge is mounted, and the deformable member is configured to stretch or deform with the stretchable fabric such that the strain gauge does not stretch beyond its elastic limit. Therefore, when the deformable member of the compression measuring device is deformed with the stretchable fabric of the compression garment, the strain gauge experiences a change in electrical resistance. As the amount of deformation of the deformable member is associated with the amount of stretch of the stretchable fabric, the electrical resistance measurement of the strain gauge may be used to determine the percentage of stretch of the stretchable fabric. The percentage of stretch of the stretchable fabric, in turn, can be used to determine the amount of force or tension that is being applied by the stretchable fabric. When the force or tension is combined by LaPlace's Law with the measured limb dimension of the wearer, the compression level of the compression garment may be calculated.

Figure 3:
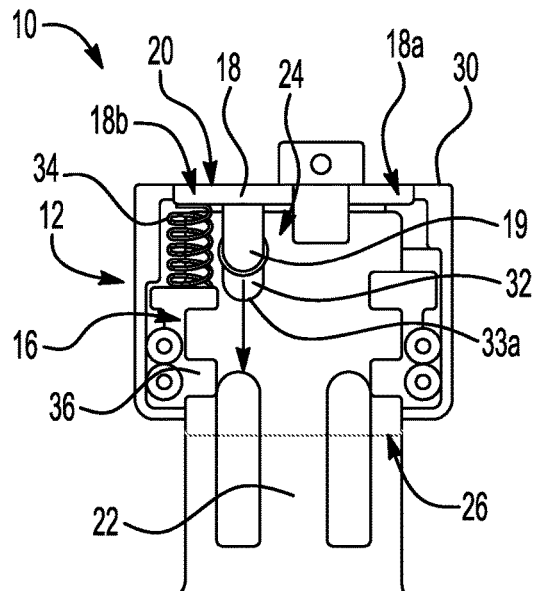
FIG. 3 is a perspective view of an exemplary compression measuring device.
Figure 4:
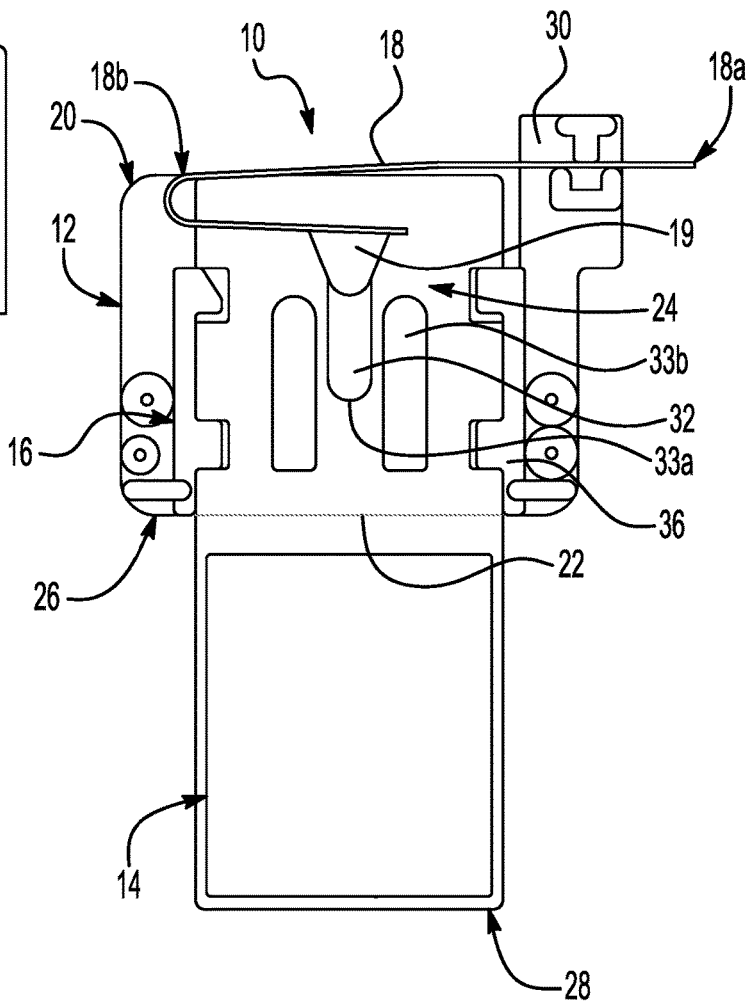
FIG. 4 is a perspective view of another exemplary compression measuring device that is variation on the device of FIG. 3.

With reference to FIGS. 3 and 4, an exemplary compression measuring device 10 is depicted, with FIG. 4 being a variation on the configuration of FIG. 3 as indicated below. The compression measuring device 10 is configured to be mounted or attached to a stretchable fabric of a compression garment (not depicted) via at least two anchors. For example, the compression measuring device 10 includes a first anchor 12 at which the compression measuring device is configured to be attached to a first location on a stretchable fabric of a compression garment, and a second anchor 14 at which the compression measuring device is configured to be attached to a second location on the stretchable fabric of the compression garment. The first location and the second location on the stretchable fabric, and therefore the first anchor 12 and the second anchor 14 of the compression measuring device 10, are spaced apart a distance from each other when the stretchable fabric is in an unstretched state. The first anchor 12 and the second anchor 14 of the compression measuring device 10 may each include a fastener, such as a hook and loop fastener, for attaching the compression measuring device 10 to the first and second locations on the stretchable fabric, respectively. Other types of fasteners, such as adhesives, stitching, or other suitable attachment methods may be applied to the first anchor 12 and the second anchor 14 for attachment to the stretchable fabric of the compression garment.

The compression measuring device 10 includes a substrate 16 configured to be attached to the first location on the stretchable fabric of the compression garment using the first anchor 12. The substrate 16 includes a deformable arm 18 cantilevered across a first end 20 of the substrate 16. The deformable arm 18 may be made of any deformable material, such as a deformable plastic or metal. For example, the deformable arm 18 may be formed as a leaf spring and may be formed with any deformable, thin-sheeted material. The deformable arm 18 may have an elastic limit greater than 2% linear stretch. The deformable arm 18 may be integrally formed or molded with the substrate 16 as a unitary component, or the deformable arm 18 may be formed as a separate component and fixed to the substrate 16 by any suitable mechanism. The deformable arm 18 is fixed to the substrate 16 at a fixed end 18a of the deformable arm 18 and extends across the first end 20 of the substrate 16 to an un-fixed, cantilevered end 18b of the deformable arm 18. The compression measuring device 10 includes a bridge 22 positioned within the substrate 16 to interact with the deformable arm 18 at a first end 24 of the bridge 22. The bridge 22 in particular is positioned about the cantilevered end 18b of the deformable arm 18. The bridge 22 extends away from the deformable arm 18 and out past a second end 26 of the substrate 16. At a second end 28 of the bridge 22, the bridge 22 is configured to be attached to the second location on the stretchable fabric of the compression garment using the second anchor 14. The bridge 22 may be elastic or inelastic and may be generally pliable, such as being made of a thin plastic sheet material.

Figure 5:
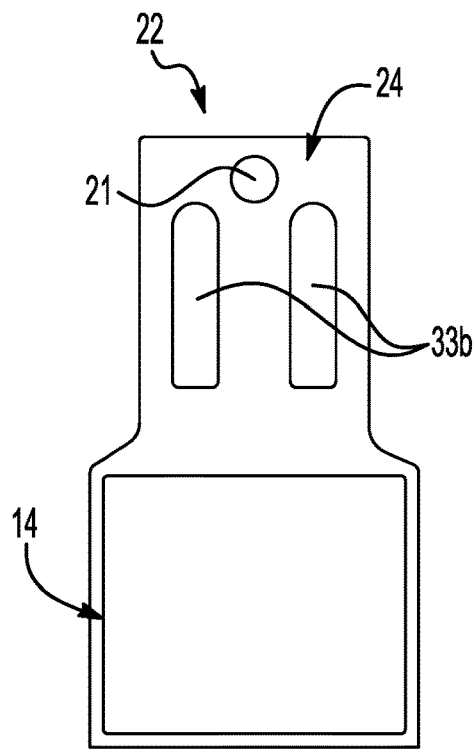
FIG. 5 is a perspective view of a bridge of the exemplary compression measuring devices of FIGS. 3 and 4.

The deformable arm 18 and the bridge 22 are positioned relative to each other such that the bridge 22 acts on the deformable arm 18 when a pulling force is applied to the bridge 22. The deformable arm 18 includes an attachment element 19 for attachment of the deformable arm 18 to the first end 24 of the bridge 22. For example, the attachment element 19 of the deformable arm may be a protrusion that extends from the cantilevered end 18b of the deformable arm 18. With additional reference to FIG. 5 depicting the bridge 22 in isolation, the first end 24 of the bridge 22 includes a receiving element 21 for receiving and engaging with the attachment element 19 of the deformable arm 18. For example, when the attachment element 19 of the deformable arm 18 is a protrusion from the cantilevered end 18b, the receiving element 21 may be a hole through the bridge 22 through which the protrusion 19 of the deformable arm 18 passes to engage with the bridge 22. As further detailed below, when a pulling force is applied to the bridge 22, the bridge pulls on the cantilevered end 18b of the deformable arm 18 by acting on the attachment element 19. Such action operates to displace the cantilevered end 18b about the fixed end 18a of the deformable arm 18.

With further reference to FIGS. 3 and 4, the substrate 16 may include additional alignment features for positioning the bridge relative to the substrate. For example, the substrate 16 may include alignment tabs 36 that are positioned to align the bridge 22 across the substrate 16. The alignment tabs 36 are not configured to be secured to the bridge 22 and are instead configured to allow the bridge 22 to slide freely thereby as the stretchable fabric of the compression garment stretches. With this configuration, the bridge 22 is positioned relative to the substrate 16 in a secured and properly aligned manner.

As referenced above, the compression measuring device 10 is attached via the first anchor 12 and the second anchor 14 to respective first and second locations on the stretchable fabric of a compression garment. As the stretchable fabric of the compression garment stretches, the first and second locations of the stretchable fabric move apart from each other, causing the first anchor 12 and the second anchor 14 of the compression measuring device 10 to commensurately move apart from each other. As this occurs, the bridge 22 pulls on the deformable arm 18 by the receiving element 21 of the bridge 22 pulling on the attachment element 19 of the deformable arm 18, causing deformation of the deformable arm 18 with the cantilevered end 18b displacing about the fixed end 18a. The bridge 22 as detailed above is attached to both the substrate 16 by the interaction of the attachment element 19 (deformable arm) and the receiving element (bridge), and to the second location of the stretchable fabric via the second anchor 14. In addition, the substrate 16 is attached to the first location of the stretchable fabric via the first anchor 12. Accordingly, when the stretchable fabric stretches, the bridge 22 slides relative to the substrate 16, and bridge 22 deforms the deformable arm 18 via interaction of the receiving element 21 on the attachment element 19.

The compression measuring device 10 includes a strain gauge 30 mounted at or adjacent to the fixed end 18a of the deformable arm 18, and the strain gauge is configured to output an electrical resistance measurement as the deformable arm 18 is deformed in the manner described above. When the deformable arm is deformed by interaction by the bridge 22 as described above, a change in strain is applied to the strain gauge which causes the electrical resistance through the strain gauge to change. In relation to FIGS. 1 and 2, this change in electrical resistance can be used to determine a percentage stretch of the stretchable fabric, and in turn the percentage stretch can be used to determine the tension of the stretchable fabric. When the tension measurement is combined with a measured limb radius accordingly to La Place's Law, the compression level then can be determined.

Any suitable strain gauge 30 may be used along with any suitable amplifier and control circuitry for calculating the compression level. The strain gauge 30 further may combined with a wireless transmitter to transmit the electrical resistance measurement of the strain gauge to a remote electronic device, such as a user's cell phone or other portable electronic device, or any other suitable computing device. Any suitable wireless interface may be employed, such as Bluetooth, WiFi, cellular transmission, or the like. For example, a strain gauge combined with Bluetooth transmitting capabilities may be used to transmit electrical resistance measurements to a remote electronic device, which then in combination with a limb dimension measurement may be used to calculate the compression level as described above. Specifically, because the amount of deformation of the deformable arm 18, as indicated by the electrical resistance measurement of the strain gauge, is commensurate with the amount of stretch of the stretchable fabric to which the compression measuring device 10 is attached, the remote electronic device may be configured to use the electrical resistance measurement of the strain gauge to determine the percentage of stretch of the stretchable fabric. As referenced above, the remote electronic device is then configured to use the percentage of stretch of the stretchable fabric, in turn, to determine the amount of force or tension that is being applied by the stretchable fabric. Using LaPlace's law, the remote electronic device is then configured to determine the compression level of the compression garment in the manner previously described. As an option, the compression measuring device further may include computational circuitry that is configured to perform the referenced calculations, with the final compression level determination being wirelessly transmitted to the external electronic device for compression level monitoring.

As illustrated in the example of FIG. 3, the compression measuring device 10 may additionally include a biasing member 34 mounted between the cantilevered end 18b of the deformable member 18 and the substrate 16 for assisting the cantilevered end 18b of the deformable arm 18 to return to an un-deformed position when the stretchable fabric returns to the unstretched state. The biasing member 34 may be, for example, a spring, such as for example a coil spring, leaf spring, or comparable device. The deformable arm 18 may, however, have sufficient elastic return properties to return to its un-deformed position without the assistance of the biasing member 34. In the example of FIG. 4, the attachment element 19 of the deformable arm 18 is located more centrally, and thus a biasing member also is not employed in the example of FIG. 4.

Additionally, the compression measuring device 10 may include one or more stops 33a, 33b configured to limit movement of the bridge relative to the substrate 16. This provides a more controlled interaction of the bridge on the deformable arm 18. For example, with specific reference to FIG. 4, a stop 33a may be configured as an end of a guide hole 32 through the substrate 16, through which the attachment element 19 of the cantilevered end 18b of the deformable arm 18 passes. The guide hole 32 may be configured such that the attachment element 19 abuts the stop 33a at the end of the guide hole 32, thereby preventing further deformation of the deformable arm 18 before the deformable arm 18 is deformed past its elastic limit. Additionally or alternatively, with additional reference to FIG. 5, a stop 33b may be configured as one or more inclined tabs on the bridge 22 that are cantilevered from a proximal end of the tabs which are attached to the bridge 22, toward a distal end of the tabs which are spaced away from the bridge 22. The one or more tabs are inclined at an angle from the proximal end of the tabs to the distal end of the tabs such that the distal end of the tabs are configured to abut the deformable arm 18 when the arm has been deformed a predetermined amount, thereby preventing the deformable arm 18 from being deformed past its elastic limit.

Figure 6:
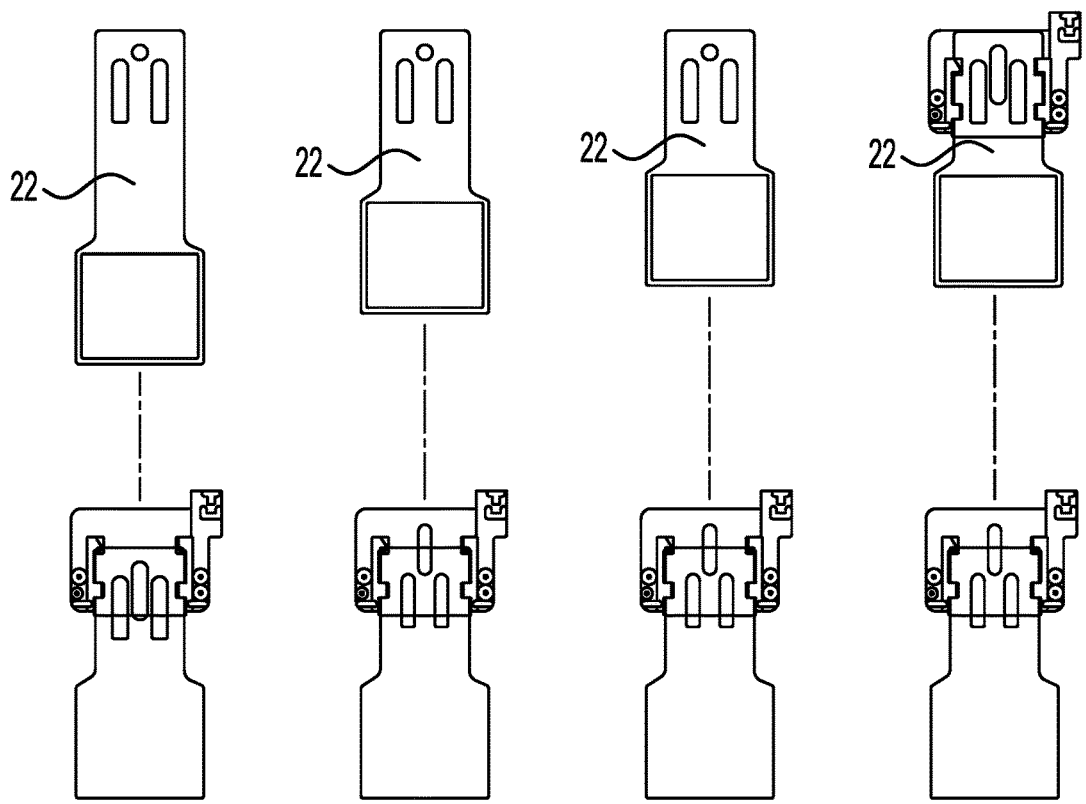
FIG. 6 is a plurality of perspective views of various lengths of the bridge depicted in FIG. 5.

The distance between the first location and the second location on the stretchable fabric, and therefore the distance between the first anchor 12 and the second anchor 14 of the compression measuring device 10, may vary depending on the stretchability of the stretchable fabric. Therefore, with reference to FIG. 6, a length of the bridge 22 may vary depending on the distance between the first location and the second location on the stretchable fabric and the distance between the first anchor 12 and the second anchor 14 of the compression measuring device 10. For example, a shorter length of the bridge 22 may be used when the compression measuring device 10 is attached to a stretchable fabric having greater stretchability. Conversely, a longer length of the bridge 22 may be used when the compression measuring device 10 is attached to a stretchable fabric having lower stretchability. FIG. 6 depicts several example lengths of the bridge 22, from the longest on the left and the shortest on the right.

Figure 7:
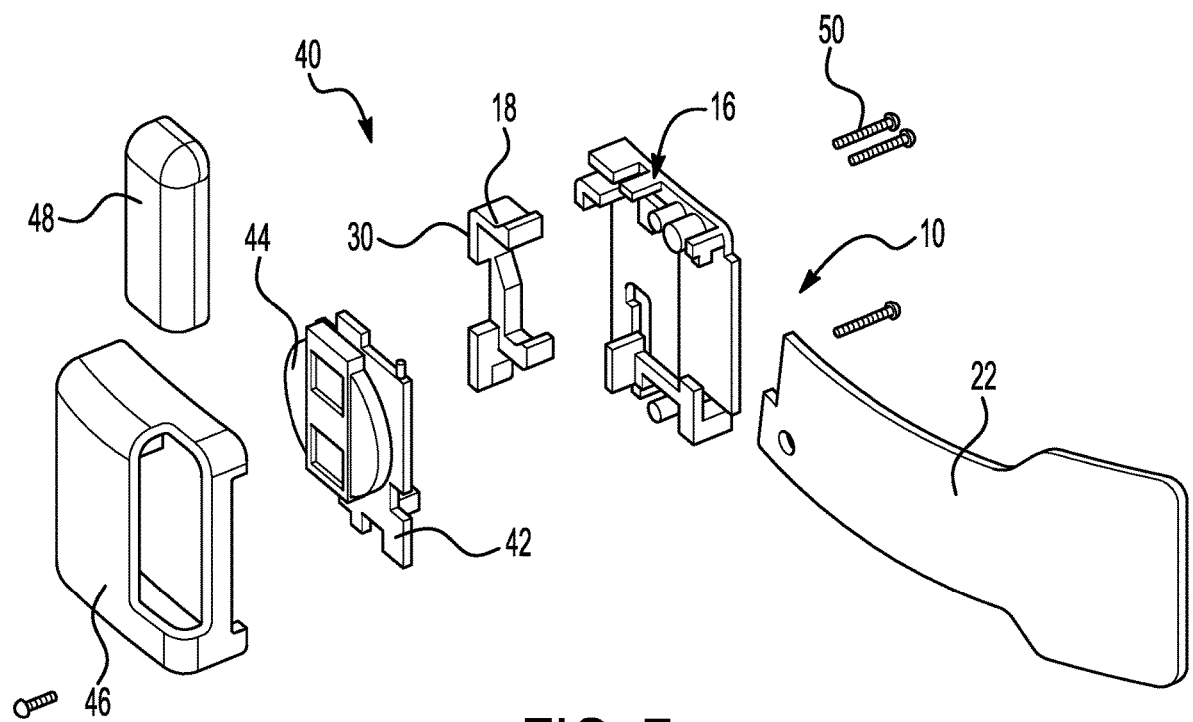
FIG. 7 is an exploded perspective view of a compression measuring assembly including the compression measuring device of FIG. 3 or 4.

FIG. 7 depicts an exploded view of a first exemplary compression measuring assembly 40 that includes the compression measuring device 10. The compression measuring assembly 40 includes the compression measuring device 10, having the substrate 16, the deformable arm 18 to which the strain gauge 30 is mounted, and the bridge 22. The compression measuring assembly 40 includes associated control circuitry 42 for wirelessly transmitting the electrical resistance values measured by the strain gauge 30 to an external electronic device. The control circuitry 42 optionally may include additional computational circuitry that is configured to perform the compression level calculations, which then may be wirelessly transmitted to the external electronic device. Accordingly, the control circuitry 42 may include wireless transmitting circuitry for transmitting the electrical resistance measurements of the strain gauge (or the compression level calculations) to the remote electronic device. The control circuitry 42 may be provided, for example, on a printed circuit board (PCB). The compression measuring assembly 40 may additionally include a battery 44 for providing power to the control circuitry 42 and strain gauge 30. The compression measuring assembly 40 may include a cover 46 configured to house the control circuitry 42, the battery 44, and the substrate 16 with the deformable arm 18. The cover 46 may, for example, attach to the substrate 16 of the compression measuring device 10 such that the control circuitry 42 and the battery 44 are housed between the cover 46 and the substrate 16. The cover 46 may include a removable battery access door 48, permitting a user to access, remove, and replace the battery 44 as needed. The compression measuring assembly 40 may be held together with, for example, screws 50 or any other suitable fastening mechanism.

Figure 8A:
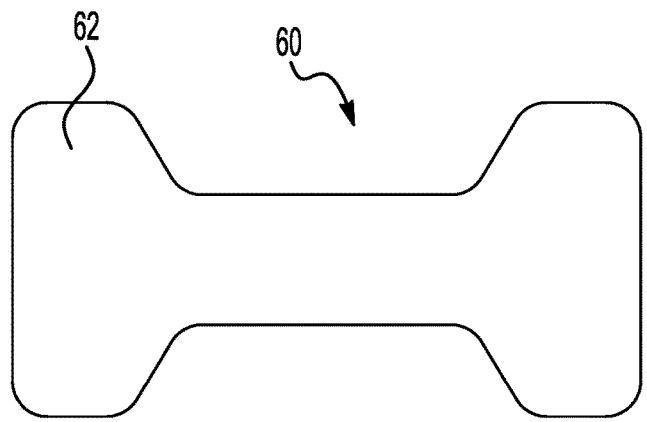
FIGS. 8A-C are perspective views of another exemplary compression measuring device.
Figure 8B:
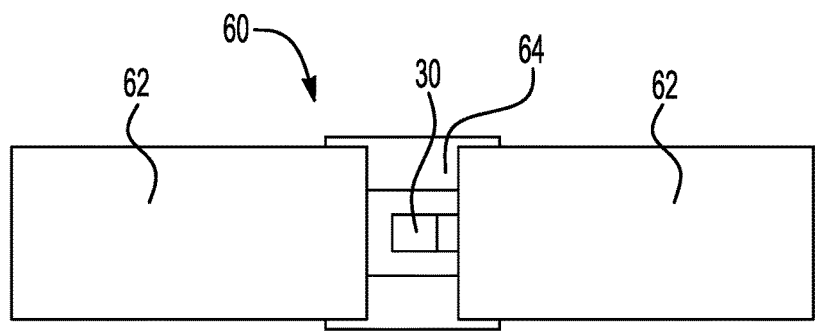
Figure 8C:
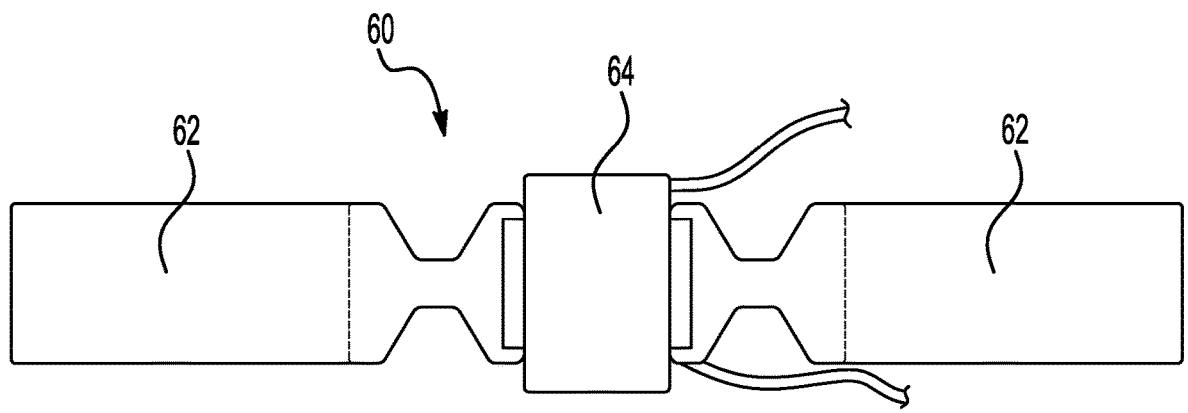

Turning now to FIGS. 8A-C, a second exemplary compression measuring device 60 to which the strain gauge 30 may be mounted to or otherwise attached to is described. The second compression measuring device 60 includes a stretchable member 62, having a significantly higher elastic limit than the strain gauge 30, that is configured to be attached to a stretchable fabric of a compression garment. As previously described, mounting or otherwise attaching the strain gauge 30 to the second compression measuring device 60, for example, will prevent the strain gauge 30 from exceeding its elastic limit when the stretchable fabric of the compression garment is stretched past 2% linear stretch. The stretchable member 62 may be rubber or any other suitable elastic material and may have any suitable shape. For example, the stretchable member 62 may have a rectangular shape (FIG. 8B), or an irregular shape (FIGS. 8A and 8C).

The stretchable member 62 may be a single contiguous piece (FIG. 8A) and the strain gauge 30 may be mounted to a middle portion thereof (strain gauge 30 not pictured in FIG. 8A). Respective end portions of the single contiguous stretchable member 62 may be fixed to the compression garment so that the stretchable member 62 is stretched commensurately with the stretchable fabric of the compression garment. Alternatively, the stretchable member 62 may include two discrete pieces with the strain gauge 30 mounted in between the two discrete pieces (FIGS. 8B and 8C). The strain gauge 30 may be attached to a first end of each of the two discrete pieces and a second end of each of the two discrete pieces are fixed to the compression garment so that the stretchable member 62 is stretched commensurately with the stretchable fabric of the compression garment. This configuration results in the gravamen of the stretching being experienced by the stretchable member 62, with the applied strain gauge 30 stretching within its linear stretch limit to provide accurate tension measurements.

As depicted in FIGS. 8B and 8C, the strain gauge 30 may be mounted to a base layer 64, such as for example a polycarbonate sheet, which in turn is directly connected to the stretchable member 62. The stretchable member 62 is mounted to the stretchable fabric of a compression garment that is to be stretched, wrapped, and secured around the limb of a user. As the stretchable fabric of the compression garment is stretched, the electrical resistance of the strain gauge 30 mounted to the stretchable member 62 is measured. As previously mentioned, any suitable strain gauge 30 may be used along with any suitable amplifier and control circuitry for calculating the compression level. For example, in a similar manner to that previously described, a wireless transmitter may be used to transmit the electrical resistance measurements of the strain gauge 30 to a remote electronic device, such as a user's cell phone or other portable electronic device, or any other suitable computing device. Again, any suitable wireless interface may be employed, such as Bluetooth, WiFi, cellular transmission, or the like. For example, a strain gauge 30 combined with Bluetooth transmitting capabilities may be used to transmit electrical resistance measurements to the remote electronic device, which then in combination with a limb dimension measurement may be used to calculate the compression level as described above. As an option, the compression measuring device further may include computational circuitry that is configured to perform the referenced calculations, with the final compression level determination being wirelessly transmitted to the external electronic device. As the amount of stretch of the stretchable member 62 is commensurate with the amount of stretch of the stretchable fabric to which the compression measuring device 60 is attached, the remote electronic device may be configured to use the electrical resistance as measured by the strain gauge to determine the percentage of stretch of the stretchable fabric. The remote electronic device is then configured to use the percentage of stretch of the stretchable fabric, in turn, to determine the amount of force or tension that is being applied to the stretchable fabric. Using LaPlace's law, the remote electronic device is then configured to determine the compression level of the compression garment in the manner previously described.

Figure 9:
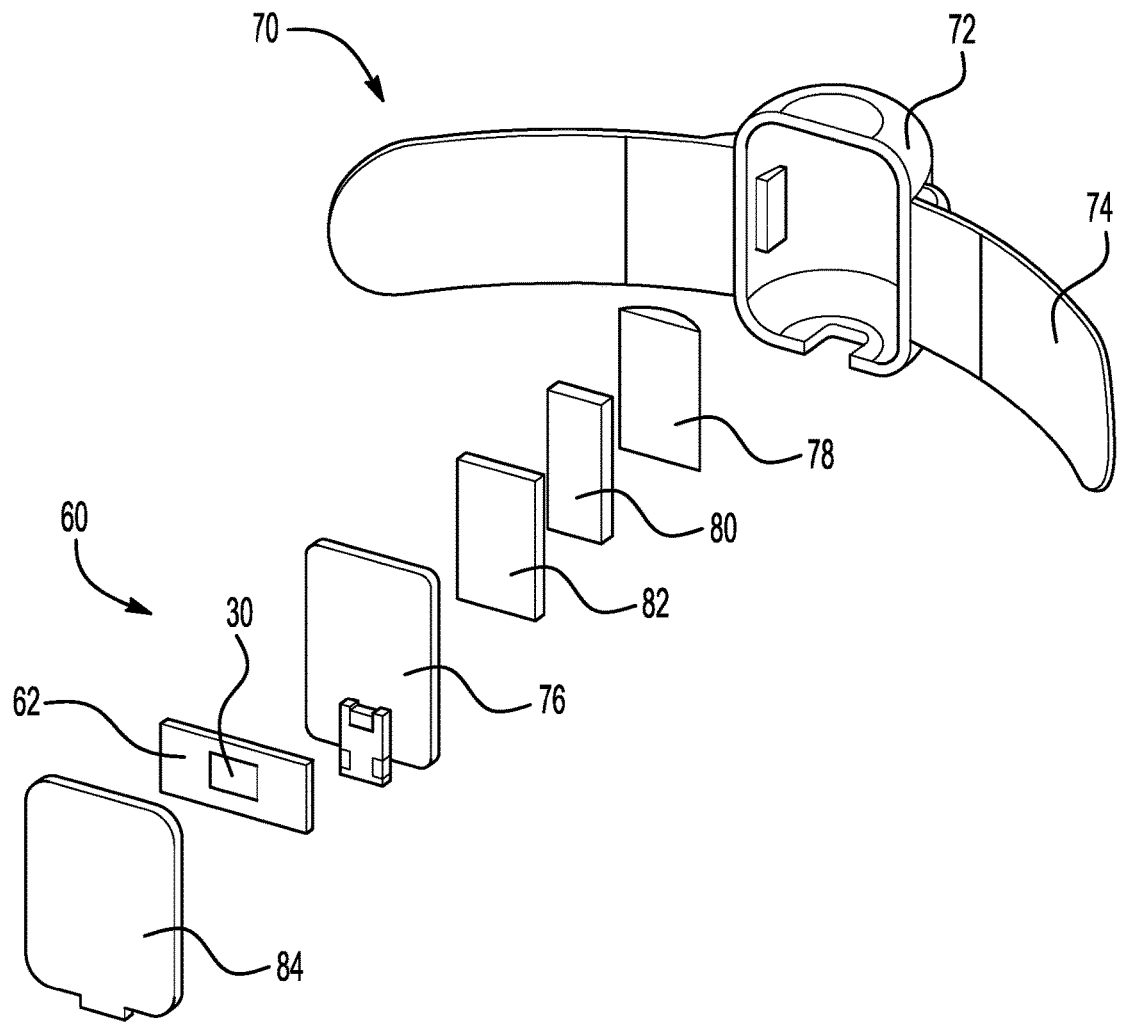
FIG. 9 is an exploded perspective view of another compression measuring assembly including the compression measuring device of FIGS. 8A-C.

FIG. 9 depicts an exploded view of a second exemplary compression measuring assembly 70 including the second exemplary compression measuring device 60. The compression measuring assembly 70 may include a case 72 with flexible hook straps 74. The case 72 provides a housing for receiving control circuitry 76, and the hook straps 74 may be used to attach the compression measuring assembly 70 to the compression garment. In a stacked arrangement from the inward direction, an inner protective foam layer 78 may be inserted into the case onto which a battery 80 is placed. An outer protective foam layer 82 then may be applied on top of the battery 80, with the battery 80 providing power to the control circuitry 76 and strain gauge. The control circuitry 76, which also can include wireless transmitting circuitry, is located within a printed circuit board (PCB) positioned on the outer protective foam layer 82, with the strain gauge 30 and base layer 64 being stacked next. The electronic components may be secured and protected within the case 72 by an outer cover 84.

Figure 10A:
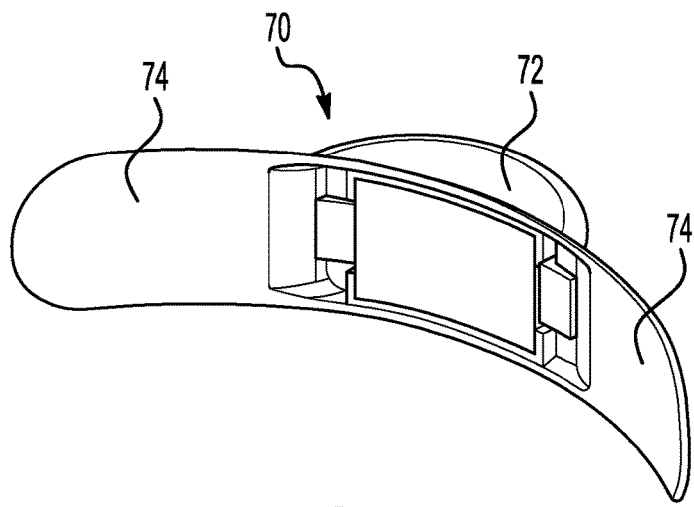
FIGS. 10A-C are perspective views of alternative arrangements of the compression measuring assembly of FIG. 9.
Figure 10B:
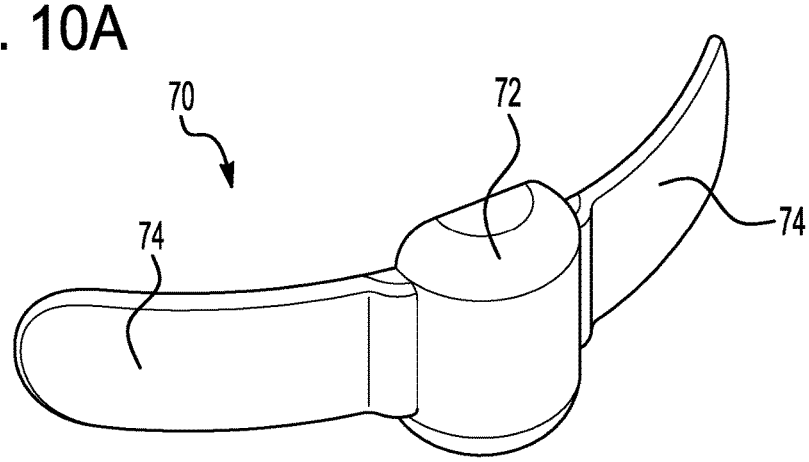
Figure 10C:
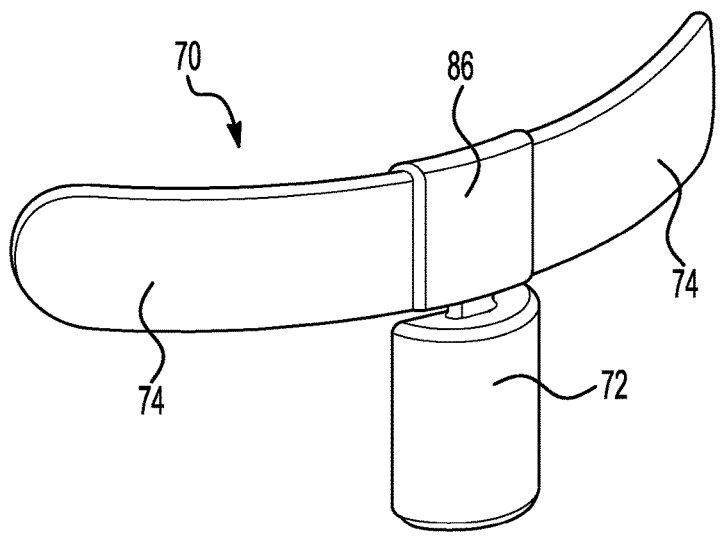

FIGS. 10A-C depict different layouts or configurations of the compression measuring assembly 70, which may be configured differently for optimizing application to certain limb areas or for other circumstances of wearing the compression garment. For example, FIG. 10A depicts a horizontal layout of the compression measuring assembly 70, in which the case 72 is arranged to extend mainly horizontally between the flexible hook straps 74. FIG. 10B depicts a vertical layout of the compression measuring assembly 70, in which the case 72 is arranged to extend mainly vertically between the flexible hook straps 74. The vertical layout of the compression measuring assembly 70 may be used if the horizontal layout is too wide, for example when the compression measuring assembly 70 is to be fit around an ankle or other small diameter area of a user's limb. FIG. 10C depicts a T-shaped layout of the compression measuring assembly 70, in which the case 72 is arranged to extend perpendicularly out from the flexible hook straps 74. Specifically, the case 72 is configured to extend out from a middle portion 68 of the compression measuring assembly 70 between the flexible hook straps 74 along a leg of the T-shape. The T-shaped layout of the compression measuring assembly 70 may be used if the horizontal and vertical layouts have too high of a profile and are too noticeable under clothes or are too obtrusive for sleeping or laying down.

In either exemplary compression measuring device 10 or 60, electrical resistance measurements of the strain gauge 30 as associated with an amount of deformation of the deformable member 18, 62 is used in combination with a limb dimension to determine and monitor a compression level of a compression garment when stretched, wrapped, and secured around the limb of a user. In this way, by using either compression measuring device 10 or 60, the user can ensure that a desired amount of force or tension is being applied by the stretchable fabric of the compression garment, and therefore that a desired pressure or compression level is being applied to the limb of the user when wearing the compression garment.

Figure 11:
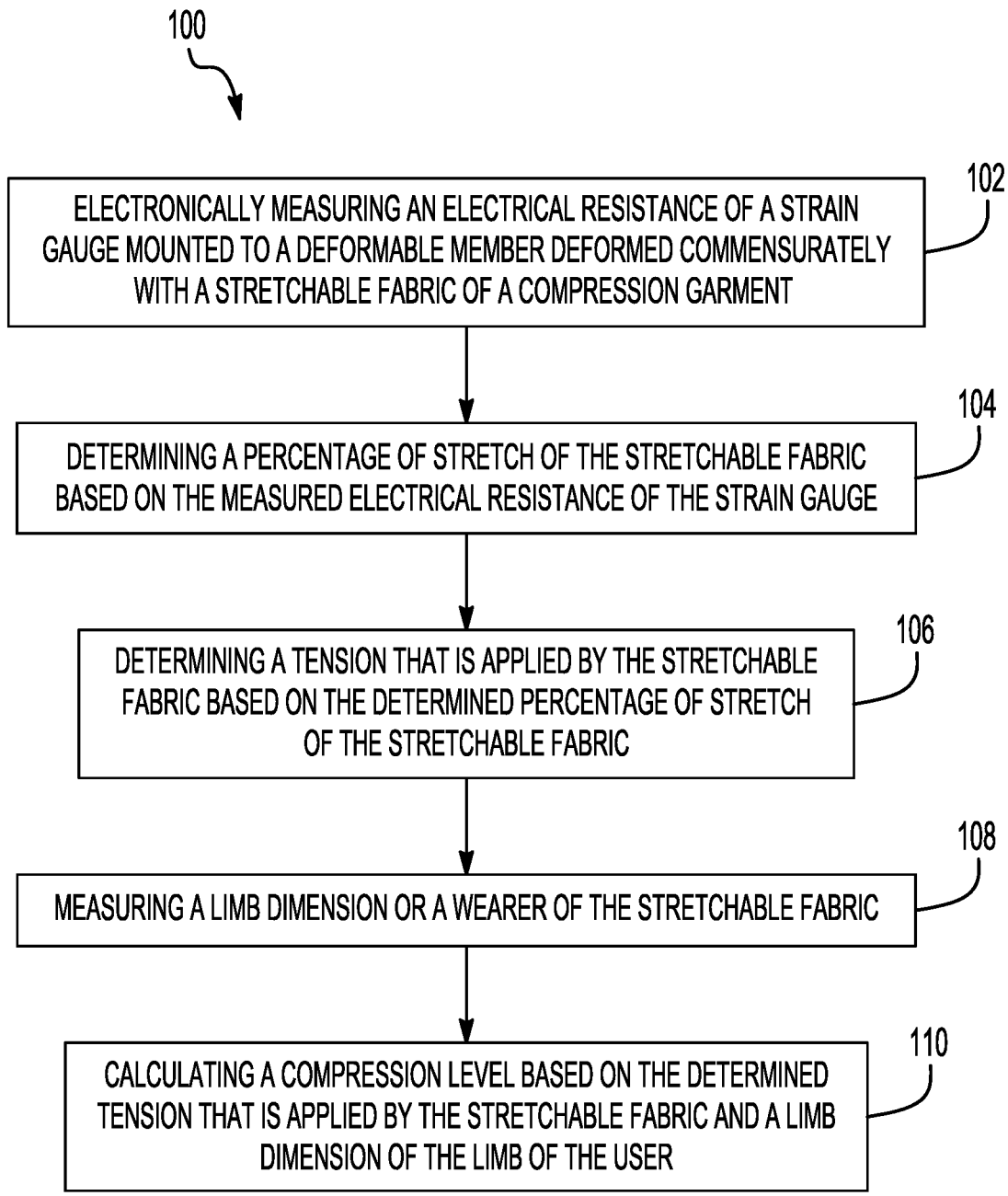
FIG. 11 is a flowchart of a method of monitoring a compression level of a compression garment wrapped around a limb of a user.

With reference to FIG. 11, a method 100 of monitoring a compression level of a compression garment wrapped around a limb of a user is depicted in a flowchart. The method 100 includes a step 102 of electronically measuring an electrical resistance of a strain gauge mounted to a deformable member when deformed commensurately with a stretchable fabric of a compression garment when the compression garment is wrapped around the limb of the user. The step 102 of electronically measuring, for example, includes electronically measuring using at least one of the compression measuring devices 10 or 60 of the compression measuring assemblies 40 or 70 previously described. The method 100 then includes a step 104 of determining a percentage of stretch of the stretchable fabric based on the measured electrical resistance of the strain gauge, and a step 106 of determining a tension that is applied by the stretchable fabric based on the determined percentage of stretch of the stretchable fabric. The method 100 may additionally include a step 108 of measuring the limb dimension of the limb of the user who is wearing the compression garment. The step of measuring the limb dimension may include manually measuring the limb dimension or automatically measuring the limb dimension with, for example, an imaging technique. The limb dimension may be a diameter of a user's limb from which a limb radius may be determined. The method 100 then includes the step 110 of calculating a compression level applied by the compression garment to the limb of the user based on the determined tension that is applied to the stretchable fabric and the limb dimension of the limb of the user.

A compression measuring device attachable to a stretchable fabric of a compression garment for measuring a compression level of the compression garment includes a substrate configured to be attached to a first location on the stretchable fabric using a first anchor of the compression measuring device. The compression measuring device includes a deformable arm cantilevered across a first end of the substrate. The deformable arm is fixed to the substrate at a fixed end and extends across the first end of the substrate to a cantilevered end of the deformable arm. The compression measuring device also includes a bridge attached to the deformable arm at a first end of the bridge and extending away from the deformable arm out past a second end of the substrate. A second end of the bridge is attached to a second location on the stretchable fabric using a second anchor of the compression measuring device. The second anchor is spaced apart from the first anchor. The compression measuring device also includes a strain gauge mounted to the deformable arm and configured to measure an electrical resistance of the strain gauge when the bridge pulls on and deforms the deformable arm as the stretchable fabric of the compression garment stretches and the first anchor and the second anchor of the compression measuring device move away from each other.

The first anchor and the second anchor may include at least one of a hook and loop fastener, an adhesive, and stitching.

The deformable arm may have an elastic limit greater than 2% linear stretch.

The deformable arm may be made of at least one of a deformable plastic material and a deformable metal material.

The bridge may be inelastic or elastic.

The bridge may be attached to the cantilevered end of the deformable arm.

The deformable arm may include an attachment element for attachment to the first end of the bridge.

The first end of the bridge may include a receiving element for receiving and engaging with the attachment element of the deformable arm.

The receiving element may be a hole in the bridge through which the attachment element of the deformable arm passes and engages the bridge.

The strain gauge may be mounted at or near the fixed end of the deformable arm.

The compression measuring device may further include a wireless transmitter for transmitting the electrical resistance measured by the strain gauge, or a compression level calculated based on the electrical resistance.

The compression measuring device may further include a biasing member mounted between the cantilevered end of the deformable arm and the substrate for assisting the cantilevered end of the deformable arm to return to an un-deformed position when the stretchable fabric returns to an unstretched state.

The biasing member may be a spring.

The compression measuring device may further include a stop configured to limit the amount of deformation of the deformable arm.

The stop may be configured as one or more inclined tabs cantilevered from a proximal end attached to the bridge toward a distal end spaced apart from the bridge.

The compression measuring device may further include one or more bridge guides configured to align the bridge across the substrate.

A compression measuring assembly for measuring a compression level of a compression garment includes the compression measuring device described herein. The compression measuring assembly additionally includes control circuitry for transmitting the electrical resistance measured by the strain gauge, and optionally further for transmitting a compression level computed by the control circuitry based on the electrical resistance, and a battery for providing power to the control circuitry and the strain gauge. The compression measuring assembly additionally includes a cover configured to house the control circuitry, the battery, and the substrate of the compression measuring device.

The cover may include a removable battery access door.

A method of monitoring a compression level of a compression garment wrapped around a limb of a user includes electronically measuring an electrical resistance of a strain gauge mounted to a deformable member when the deformable member is deformed with stretching a stretchable fabric of the compression garment when the compression garment is wrapped around the limb of the user. The method also includes determining a percentage of stretch of the stretchable fabric based on the measured electrical resistance of the strain gauge and determining a tension that is applied by the stretchable fabric based on the determined percentage of stretch of the stretchable fabric. The method also includes calculating a compression level applied by the compression garment to the limb of the user based on the determined tension that is applied to the stretchable fabric and a limb dimension of the limb of the user.

The method may include measuring the limb dimension of the limb of the user, including at least one of manually measuring the limb dimension and automatically measuring the limb dimension using an imaging technique.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A compression measuring device attachable to a stretchable fabric of a compression garment for measuring a compression level of the compression garment, the compression measuring device comprising:
a substrate having a first anchor, the substrate being configured to be attached to a first location on the stretchable fabric using the first anchor;
a deformable arm cantilevered across a first end of the substrate, the deformable arm being fixed to the substrate at a fixed end and extending across the first end of the substrate to a cantilevered end of the deformable arm;
a bridge attached to the deformable arm at a first end of the bridge and extending away from the deformable arm out past a second end of the substrate, the bridge having a second anchor at a second end of the bridge being configured to be attached to a second location on the stretchable fabric using the second anchor, the second anchor being spaced apart from the first anchor; and
a strain gauge mounted to the deformable arm and configured to measure an electrical resistance when the bridge pulls on and deforms the deformable arm as the stretchable fabric of the compression garment stretches and the first anchor and the second anchor move away from each other.

2. The compression measuring device according to claim 1, wherein the first anchor and the second anchor include at least one of a hook and loop fastener, an adhesive, and stitching.

3. The compression measuring device according to claim 1, wherein the deformable arm has an elastic limit greater than 2% linear stretch.

4. The compression measuring device according to claim 1, wherein the deformable arm is made of at least one of a deformable plastic material and a deformable metal material.

5. The compression measuring device according to claim 1, wherein the bridge is inelastic.

6. The compression measuring device according to claim 1, wherein the bridge is attached to the cantilevered end of the deformable arm.

7. The compression measuring device according to claim 1, wherein the deformable arm includes an attachment element for attachment to the first end of the bridge.

8. The compression measuring device according to claim 7, wherein the first end of the bridge includes a receiving element for receiving and engaging with the attachment element of the deformable arm.

9. The compression measuring device according to claim 8, wherein the attachment element is a protrusion that extends from the cantilevered end of the deformable arm, and the receiving element is a hole through the bridge through which the protrusion passes for engagement with the bridge.

10. The compression measuring device according to claim 1, wherein the strain gauge is mounted at or near the fixed end of the deformable arm.

11. The compression measuring device according to claim 1, further including a wireless transmitter for wirelessly transmitting the electrical resistance measurement as measured by the strain gauge or a compression level calculated based on the electrical resistance.

12. The compression measuring device according to claim 1, further comprising a biasing member mounted between the cantilevered end of the deformable arm and the substrate for assisting the cantilevered end of the deformable arm to return to an un-deformed position when the stretchable fabric returns to an unstretched state.

13. The compression measuring device according to claim 12, wherein the biasing member is a spring.

14. The compression measuring device according to claim 1, further comprising a stop configured to limit an amount of deformation of the deformable arm.

15. The compression measuring device according to claim 14, wherein the stop is configured as one or more inclined tabs cantilevered from a proximal end attached to the bridge toward a distal end spaced apart from the bridge.

16. The compression measuring device according to claim 1, further comprising one or more bridge guides configured to align the bridge across the substrate.

17. A compression measuring assembly for measuring a compression level of a compression garment, the compression measuring assembly comprising:
the compression measuring device according to claim 1;
control circuitry for wirelessly transmitting the electrical resistance measurement as measured by the strain gauge or a compression level calculated based on the electrical resistance;
a battery for providing power to the control circuitry and the strain gauge; and
a cover configured to house the control circuitry, the battery, the deformable arm, and the substrate of the compression measuring device.

18. The compression measuring assembly according to claim 17, wherein the cover includes a removable battery access door.

* * * * *